United States Patent
Burquist et al.

(10) Patent No.: US 7,190,470 B2
(45) Date of Patent: Mar. 13, 2007

(54) SYSTEM AND METHOD FOR AUTOMATIC DOCUMENT VERIFICATION

(75) Inventors: Joseph L. Burquist, Boise, ID (US); Darius Boockholdt, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1070 days.

(21) Appl. No.: 09/828,341

(22) Filed: Apr. 5, 2001

(65) Prior Publication Data

US 2002/0145747 A1     Oct. 10, 2002

(51) Int. Cl.
*G06F 15/00* (2006.01)
*G06K 9/00* (2006.01)

(52) U.S. Cl. ............... 358/1.14; 358/1.15; 382/112

(58) Field of Classification Search ...... 358/1.11–1.18, 358/1.1, 1.9; 399/15, 31; 382/112, 218
See application file for complete search history.

(56) References Cited

U.S. PATENT DOCUMENTS

| | | | | |
|---|---|---|---|---|
| 5,319,562 A | * | 6/1994 | Whitehouse | 705/403 |
| 5,390,003 A | * | 2/1995 | Yamaguchi et al. | 399/366 |
| 5,963,656 A | * | 10/1999 | Bolle et al. | 382/124 |
| 5,974,447 A | * | 10/1999 | Cannon et al. | 709/206 |
| 6,088,119 A | * | 7/2000 | Manchala et al. | 358/1.14 |
| 6,099,181 A | * | 8/2000 | Kitabatake | 400/710 |
| 6,275,600 B1 | * | 8/2001 | Banker et al. | 382/112 |
| 6,335,978 B1 | * | 1/2002 | Moscato et al. | 382/112 |
| 6,377,758 B1 | * | 4/2002 | OuYang et al. | 399/15 |
| 6,515,755 B1 | * | 2/2003 | Hasegawa | 358/1.14 |
| 6,590,995 B1 | * | 7/2003 | Schwenk et al. | 382/100 |
| 6,680,783 B1 | * | 1/2004 | Pierce et al. | 358/1.14 |

FOREIGN PATENT DOCUMENTS

| | | |
|---|---|---|
| CN | 1107990 | 9/1995 |
| EP | 0773513 A1 | 5/1997 |
| WO | WO00/48127 | 8/2000 |

* cited by examiner

*Primary Examiner*—Douglas Q. Tran
*Assistant Examiner*—Thierry L Pham

(57) ABSTRACT

A system and method for verifying a printed document. Generally, the system is implemented to automatically compare first and second images and provide an output with respect thereto. In an illustrative embodiment, the inventive system includes a computer for providing a first electronic image of a document. The image may be provided via a network such as the Internet. A printer is coupled to the computer and driven to print the document. The document is then scanned to provide a second electronic image of the document. The scanned image is then compared to the original image to provide verification of the printed output. For text based documents, the first and second images may be converted to text using conventional optical character recognition software to facilitate comparison. In a refinement of the present teachings, a mechanism is provided to detect a file characterization by which a restriction may be imposed on the number of the documents to be printed. If a document is restricted, successful printouts above the restriction are disabled. As a further refinement, a second mechanism is included to enable a fingerprint to be printed on the restricted document. When scanned, the fingerprint provides an indication of the operability of the printer and the scanner. In the event the fingerprint is not detected, the printer is disabled. This mechanism would be useful in a pay-to-print application to frustrate fraudulent efforts to disable the scanner and thereby cause the printer to output unauthorized printouts.

35 Claims, 3 Drawing Sheets

SYSTEM AND METHOD FOR AUTOMATIC DOCUMENT VERIFICATION

BACKGROUND OF THE INVENTION

1. Field of the Invention

This invention relates to systems and methods for producing documents, e.g. printers, scanners and other such systems. Specifically, the present invention relates to systems and methods for verifying accurate and reliable document production.

2. Description of the Related Art

For many applications, accurate verification of a printed document is essential. Currently, verification is generally performed manually by visually inspecting the document. For certain applications, an automated system for effecting document verification is needed. One such application is the 'pay to print' application.

Previously, if one wanted to purchase stamps, a book, tickets to an event (any sort of hard copy output that has an intrinsic value) one would have to travel to a store and purchase the item. Today a person can order these items over the Internet and the vendor will then ship the item to one's address. In the future, people may want to be able to print these valuable documents in their home/office to simplify the purchase process. Vendors may wish to enable this selling option and lower the cost and effort associated with the sale and purchase of their products.

If so, vendors may desire a way of making sure that the purchaser cannot print multiple copies of the product. Customers will require a way of making sure that the printer has successfully printed the purchased item so that it will serve its' intended purpose. For example, a faded printout of a purchased map may not meet the customers requirement, but they may be prevented from printing a second copy. The same would hold for a copy of a new novel, stamps, or tickets to the opera.

Another potential application is that of document scanning. Currently, many documents are being scanned to minimize the physical storage costs associated therewith. Each scanned image should be compared to the original document for verification. As large numbers of documents are typically scanned in each job, the process of verification of each document would be excessively tedious, time consuming and costly if performed manually.

Hence, a need exists in the art for a system and method for automatic document verification. Specifically, a need exists in the art for system and method for automatically verifying printed as well as scanned documents.

SUMMARY OF THE INVENTION

The need in the art is addressed by the system and method for verifying a printed document of the present invention. Generally, the system is implemented to automatically compare first and second images and provide an output with respect thereto.

In an illustrative embodiment, the inventive system includes a computer for providing a first electronic image of a document. The image may be provided via a network such as the Internet. A printer is coupled to the computer and driven to print the document. The document is then scanned to provide a second electronic image of the document. The scanned image is then compared to the original image to provide verification of the printed output.

For text based documents, the first and second images may be converted to text using conventional optical character recognition software to facilitate comparison.

In a refinement of the present teachings, a mechanism is provided to detect a file characterization by which restriction is imposed on the number of the documents to be printed. If a document is restricted, successful printouts above the restriction are disabled.

As a further refinement, a second mechanism is included to enable a fingerprint to be printed on the restricted document. When scanned, the fingerprint provides an indication of the operability of the printer and the scanner. In the event the fingerprint is not detected, the printer is disabled. This mechanism would be useful in a pay-to-print application to frustrate fraudulent efforts to disable the scanner and thereby cause the printer to output unauthorized printouts.

DETAILED DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
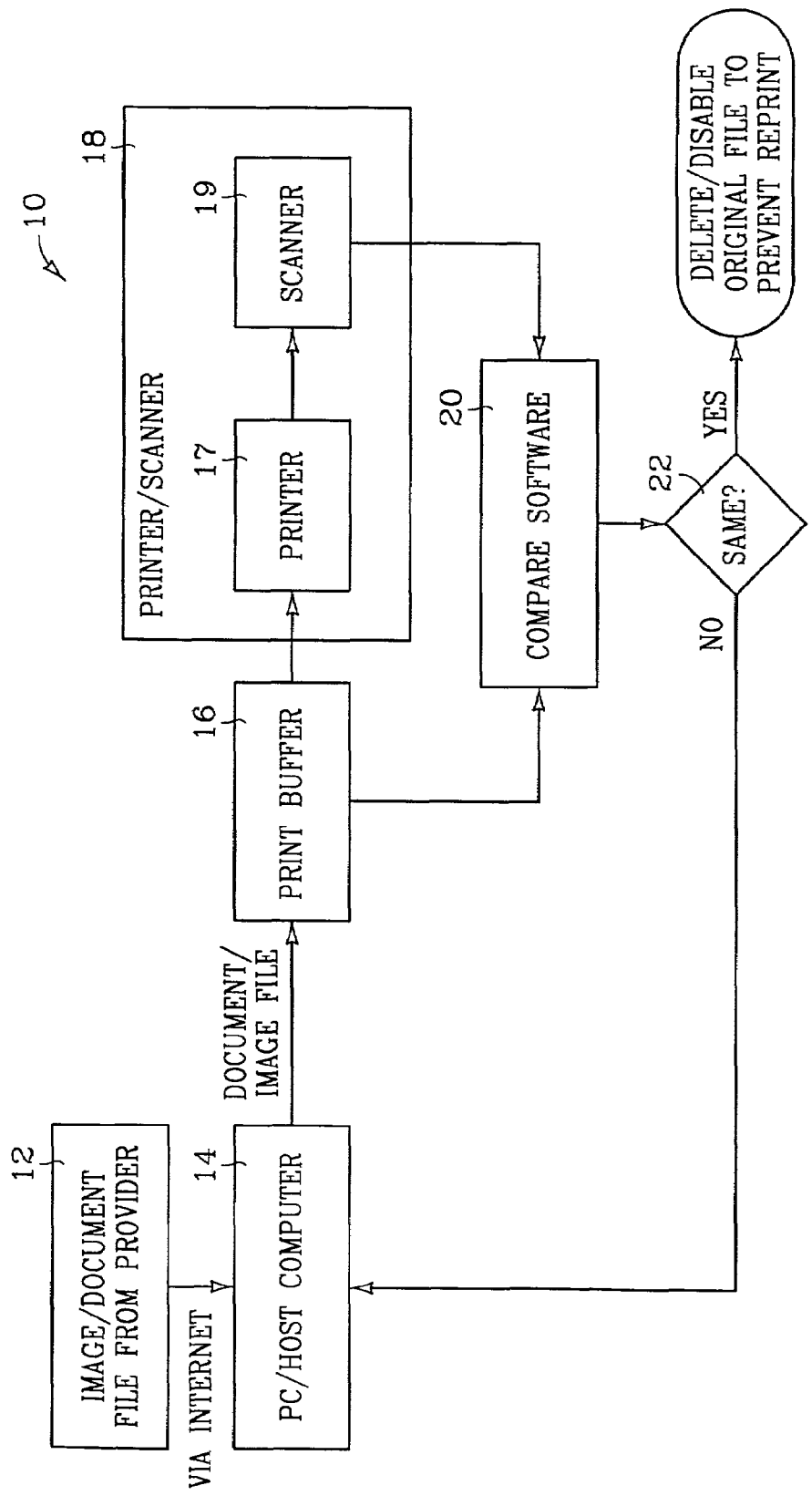
FIG. 1 is a block diagram showing an illustrative implementation of the verification system of the present invention.

FIG. 1 is a block diagram showing an illustrative implementation of the verification system of the present invention. The system 10 is adapted to receive an electronic document 12 from a provider. The document provides a first image and may be received via a network such as the Internet. In practice, the document might be a restricted (e.g. 'pay to print') document such as a sheet of stamps, tickets to an event, a book, or any other document of value. That is, materials that are purchased over the Internet or remotely, in any other manner, could be sent with a special "print once and discard/disable" command attached to the file.

In any event, the image 12 is received by a computer 14. The computer 14 may be a server or a client on a network or a stand alone personal computer. The image 12 is transferred to a printer/scanner 18 via a print buffer 16. The buffer 16 may be implemented on the personal computer 14 of in the printer/scanner 18.

In the best mode, the printer/scanner 18 is a multi-functional device capable of both printing and scanning operations. In accordance with the present teachings, after a document is printed, for those documents for which verification is desired, the media is scanned by either being manually or mechanically reinserted or traversing a scanner 19 after exiting a printer 17 thereof. (The present teachings could also be implemented by adding an inexpensive scanning device (internally or externally) to a standard printer.) The scan of the document generates a second electronic image thereof.

As discussed more fully below, in accordance with the present teachings, software 20, preferably resident in the computer 14 of the printer/scanner 18, compares the first and second electronic images to verify that the printer actually printed the desired document with a level of print quality such that the output will serve its intended purpose. If the two correlate within an acceptable window of error, the purchased file is then deleted to prevent multiple prints. If the two do not correlate the printer will assume an error of some sort, alert the printer user and allow for a reprint of the document. Once the document is ultimately printed successfully, the purchased file would be automatically deleted.

Figure 2:
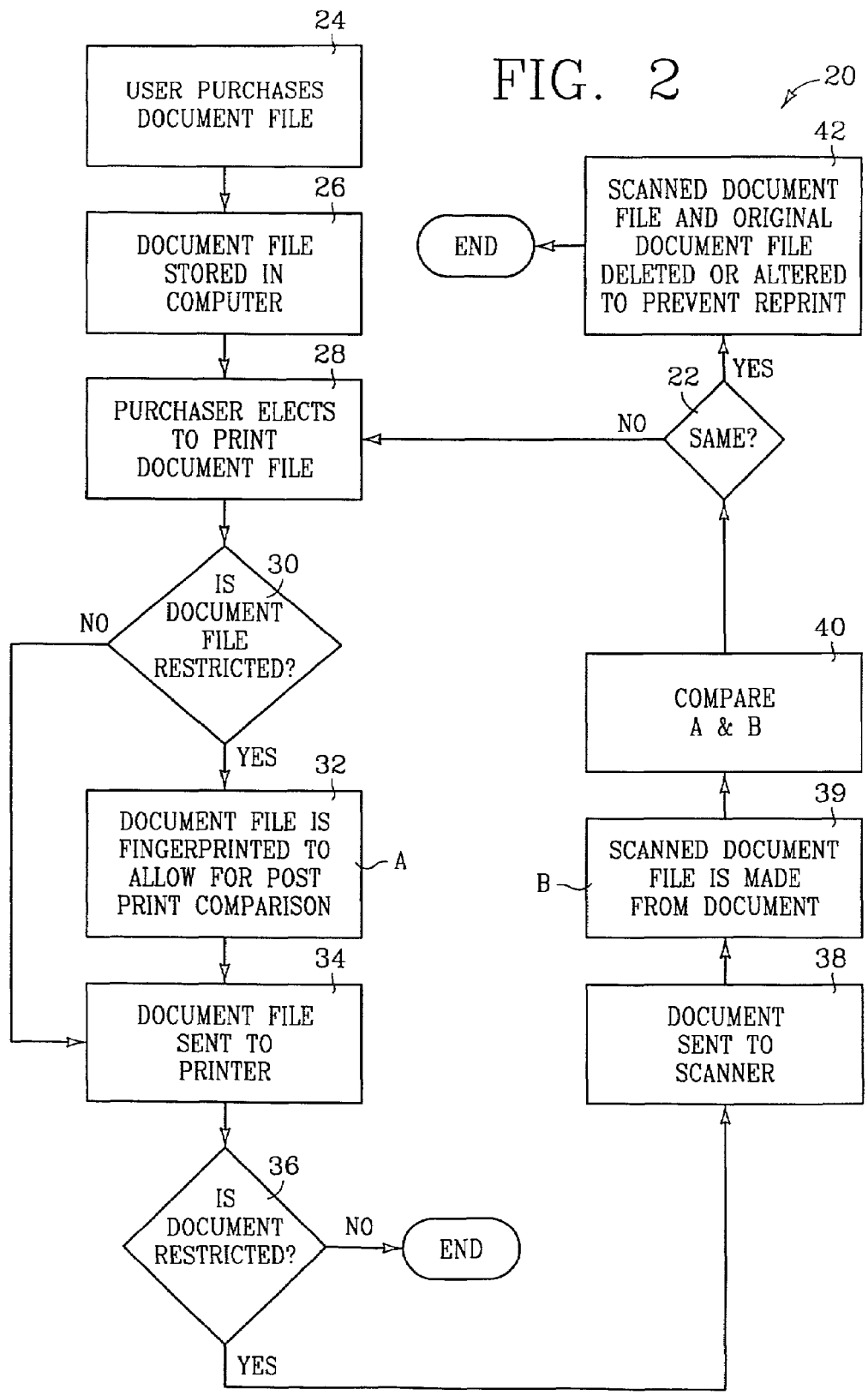
FIG. 2 is a flow diagram illustrative of the verification method of the present invention.

FIG. 2 is a flow diagram illustrative of the verification method of the present invention. In the best mode, the method is implemented in software 20. At step 24, a user purchases a document. In the best mode, the document is delivered via a network and, at step 26, stored in the computer 14 (FIG. 1). Those skilled in the art will appreciate that the present teachings are not limited to the manner by which the document is delivered. The document may be generated locally or supplied on a storage media such as a CD ROM, floppy disk, hard disk, memory card, etc.

At step 28, when the user elects to print the document, the software 20 checks to determine whether the document is restricted (step 30). If the document is not restricted, it is printed at step 34. However, if the document is restricted, then at step 32, a fingerprint is added to the document file to allow for post print comparison. The fingerprint may be a random matrix of n×m rows and columns such as is depicted in FIG. 3.

Figure 3:
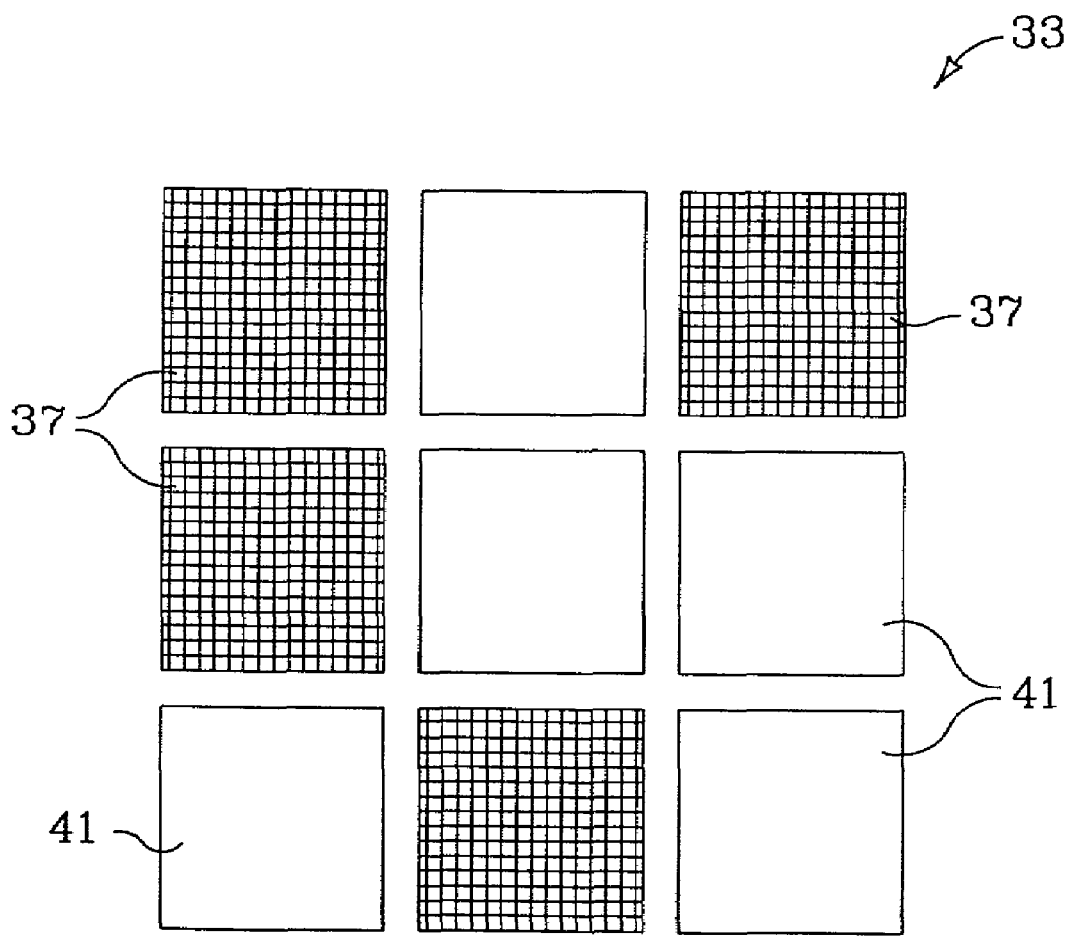
FIG. 3 is a diagram of an illustrative fingerprint utilized by the verification system and method of the present invention.

FIG. 3 is a diagram of an illustrative fingerprint utilized by the verification system and method of the present invention. Note that in the fingerprint 33, several pixels 37, chosen at random, are turned on, while several remaining pixels 39 are off.

Returning to FIG. 2, at step 34, if the document is restricted, then, at step 38, the document is sent to the scanner 19 (FIG. 1). At step 39, as a result of the scan, a second electronic image is created. While the second image has been derived from the first image, the present system and method effects a comparison of the print quality of a document on which the first image was to be printed.

In accordance with the present teachings, at step 40, the first and second images are compared. The comparison may be effected for text based documents by performing an optical character recognition (OCR) on the two images and comparing the resulting text files. OCR software is well-known in the art, as is software for comparing two text files. However, in the event that the images are not text based, more sophisticated image comparison software must be used. For this purpose, one might adapt image processing techniques widely used in other applications such as navigation, target recognition etc. The present teachings are not limited to the manner by which the images are compared.

Returning to FIG. 2, if, at step 40, the images are not found to be the same (within a variable user defined threshold), then, at step 22 the process repeats from step 28. If the two images are found to compare within the threshold, then at step 42, the first image file is deleted from memory or altered to prevent reprints. The scanning comparison could simply count up total pixels on a page and determine if the output total is within a certain tolerance band of the original file. The comparison could be more exact and focus in on certain areas of the output to make sure that patterns in the output conform to those in the input file. In the extreme, this approach could be used as a print quality sensor.

To simplify the process of verification for long jobs, the printer could verify output only on first and last pages. This would limit the number of pages to be scanned and processed.

Thus, the present invention has been described herein with reference to a particular embodiment for a particular application. Those having ordinary skill in the art and access to the present teachings will recognize additional modifications, applications and embodiments within the scope thereof. For example, the present teachings could be used to verify the accuracy of documents scanned and stored electronically. In effect, the print step is eliminated. After the documents are scanned and delivered, a subsequent scan could be performed and the images compared automatically to confirm that each document has been properly scanned.

In addition, the scanner could also be use to assure receipt and printing of incoming faxes. Currently, printer manufacturers store numerous jobs in memory to protect against the possibility of poor printing. This way, the user can recall a job if the print output is unacceptable. Use of the scanner for this purpose would greatly reduce the amount of memory that would be needed on the printer and therefore reduce the cost of the printer as well.

The present teachings could also have application in the area of Secure Printing. The printer could use the on-board scanner to check the output before delivering the document to a secure output bin/mailbox. If the print was determined to have failed, the printer would send a warning to the user and then destroy the output.

It is therefore intended by the appended claims to cover any and all such applications, modifications and embodiments within the scope of the present invention.

What is claimed is:

1. A system for verifying a document comprising:
   first means for providing a first electronic image of a document;
   second means for providing a second electronic image of a document, said second electronic image being a scanned copy of a printed version of said first electronic image; and
   third means for comparing said first and second electronic images and providing an output in response thereto, wherein said output signifies whether said printed version of said first electronic image is a successful print and causes a prohibition of additional printed versions from being produced from another print request if said output is signified to be a successful print.

2. The invention of claim 1 wherein said second image is derived from said first image.

3. The invention of claim 1 wherein said second means includes a scanner.

4. The invention of claim 3 wherein said second means includes a printer.

5. The invention of claim 4 wherein said scanner is mounted to scan a document printed by said printer to provide said second image.

6. The invention of claim 5 further including means for adding a fingerprint to said printed version which becomes a part of said second image.

7. The invent on of claim 6 further including means for printing said fingerprint on said document.

8. The invention of claim 7 wherein said scanner is adapted to scan said fingerprint and provide a fingerprint output signal in response thereto.

9. The invention of claim 8 further including means responsive to said fingerprint output signal for disabling said printer when said fingerprint of said printed version is nor detected in an image that is purported to be a scanned copy of said printed version.

10. The invention of claim 5 further including means for detecting a print restriction with respect to said first image.

11. The invention of claim 10 further including means responsive to said print restriction and said third means for disabling a second print of said document.

12. The invention of claim 1 wherein said first means includes a personal computer.

13. The invention of claim 12 wherein said first image is obtained from a network.

14. The invention of claim 13 wherein said network is the Internet.

15. The invention of claim 1 wherein said third means includes software stored on a computer readable medium.

16. The invention of claim 15 wherein said software is stored in memory in a personal computer.

17. The invention of claim 15 wherein said software is stored in memory in scanner.

18. The invention of claim 1 wherein said third means includes means for converting said first image to text.

19. The invention of claim 18 wherein said third means includes means for converting said second image to text.

20. The invention of claim 19 wherein said third means includes means for comparing said text representing said first image to said text representing said second image.

21. A system for verifying a printed document comprising:
    a computer for providing a first electronic image of a document; a printer coupled to said computer;
    a scanner adapted to scan a document printed by said printer to provide a second electronic image of said document, said second electronic image being a scanned copy of a printed version of said first electronic image; and
    software for comparing said first and second electronic images and providing an output in response thereto, wherein said output signifies whether said printed version of said first electronic image is a successful print and causes a prohibition of additional printed versions from being produced from another print request if said output is signified to be a successful print.

22. The invention of claim 21 further including means for adding a fingerprint to said printed version which is then becomes a part of said second image.

23. The invention of claim 22 further including means for printing said fingerprint on said document.

24. The invention of claim 23 wherein said scanner is adapted to scan said fingerprint and provide a fingerprint output signal in response thereto.

25. The invention of claim 24 further including means responsive to said fingerprint output signal for disabling said printer when said fingerprint of said printed version is not detected in an image that is purported to be a scanned copy of said printed version.

26. The invention of claim 21 further including means for detecting a print restriction with respect to said first image.

27. The invention of claim 26 further including means responsive to said print restriction and said software for disabling a second print of said document.

28. The invention of claim 21 wherein said first image is obtained from a network.

29. The invention of claim 28 wherein said network is the Internet.

30. The invention of claim 21 wherein said software is stored in memory in a personal computer.

31. The invention of claim 30 wherein said software is stored in memory in a scanner.

32. The invention of claim 30 wherein said software includes means for converting said first image to text.

33. The invention of claim 32 wherein said software includes means for comparing said second image to text.

34. The invention of claim 33 wherein said software includes means for comparing said text representing said first image to said text representing said second image.

35. A method for verifying a document including the steps of:
    providing a first electronic image of a document;
    providing a second electronic image of a document, said second electronic image being a scanned copy of a printed version of said first electronic image; and
    comparing said first and second electronic images and providing an output in response thereto wherein said output signifies whether said printed version of said first electronic images is a successful print and causes a prohibition of additional printed versions from being produced from another print request if said output is signified to be a successful print.

* * * * *

UNITED STATES PATENT AND TRADEMARK OFFICE
CERTIFICATE OF CORRECTION

PATENT NO. : 7,190,470 B2
APPLICATION NO. : 09/828341
DATED : March 13, 2007
INVENTOR(S) : Joseph L. Burquist et al.

It is certified that error appears in the above-identified patent and that said Letters Patent is hereby corrected as shown below:

In column 4, line 61, in Claim 7, delete "invent on" and insert -- invention --, therefor.

In column 5, line 1, in Claim 9, delete "nor" and insert -- not --, therefor.

In column 5, line 20, in Claim 17, after "memory in" insert -- a --.

In column 5, line 45, in Claim 22, after "which" delete "is".

In column 6, line 27, in Claim 33, delete "comparing" and insert -- converting --, therefor.

In column 6, line 39, in Claim 35, delete "thereto" and insert -- thereto, --, therefor.

Signed and Sealed this

Eighteenth Day of August, 2009

David J. Kappos
*Director of the United States Patent and Trademark Office*